United States Patent Office 2,866,753
Patented Dec. 30, 1958

2,866,753

PROCESS FOR REMOVING FREE SULFUR WITH AN ORGANIC PHOSPHITE

George W. Ayers, Chicago, Ill., assignor to The Pure Oil Company, Chicago, Ill., a corporation of Ohio No Drawing. Application July 17, 1956
Serial No. 598,243

20 Claims. (Cl. 208—240)

This invention relates to the desulfurization of sulfur-containing hydrocarbon fractions. It is more specifically concerned with the removal of elemental or loosely bound sulfur from petroleum-derived fractions.

The presence of elemental surfur in hydrocarbon fractions can be due to any one or more of the following: (1) Sulfur may occur in small amount in the crude petroleum oil and may be distilled along with petroleum fractions boiling above about 300° F.; (2) crude petroleum oil containing no elemental sulfur may form sulfur-containing compounds during distillation which react to form elemental surfur as one of the products; (3) crude petroleum oil or hydrocarbon fractions containing hydrogen sulfide may be acted upon by air to produce elemental sulfur in the hydrocarbon liquid or vapor; and (4) too great an excess of elemental sulfur may be added to the hydrocarbon liquid during its treatment with a sweetening agent such as doctor solution, resulting in the presence of elemental sulfur in the sweetened product.

Because elemental sulfur or loosely bound sulfur is corrosive, it is an undesirable constituent in various hydrocarbon compositions, especially petroleum distillates used in motor fuel blends, petroleum naphthas employed as solvents, burning oils and the like. Furthermore, if it is present in naphthas used in certain paint or lacquer formulations, it may cause darkening of the color of the paint or lacquer product upon long standing in the containers before use in finishing operations. The expression "elemental or loosely bound sulfur" employed in the description of this invention is the sulfur which can be detected in a hydrogen sulfide-free hydrocarbon composition subjected to the scrutiny of the copper strip test method for free and corrosive sulfur in petroleum products (A. S. T. M. Method D130) carried out at 122° F., and to the mercury test wherein a portion of the hydrogen sulfide-free hydrocarbon composition is shaken violently with up to 5% of its volume of clean mercury. The presence of elemental sulfur is indicated when a black precipitate is obtained after violent shaking of the hydrogen sulfide-free hydrocarbon composition with the mercury. It desired, the elemental sulfur content of the hydrocarbon composition may be determined quantitatively by by the procedure listed as U. O. P. Method No. H–19–40 "Elementary Sulfur in Gasoline" in "U. O. P. Laboratory Test Methods for Petroleum and its Products," published in 1940 by Universal Oil Products Company, Chicago, Illinois. Generally, however, the elemental sulfur content of petroleum fractions is not due to naturally occurring sulfur, but usually obtains by being introduced as a result of the so-called "doctor" type of sweetening treatment of the fraction, or because of oxidation of the hydrogen sulfide in the fraction by atmospheric oxygen. Even though attempts can be made to control the incorporation of sulfur by sweetening without the use of elemental sulfur, or by removing the hydrogen sulfide before it has the opportunity to be oxidized, elemental or loosely bound sulfur can be found occasionally in petroleum fractions. Elemental or loosely bound sulfur in this environment is removed only with considerable difficulty.

Accordingly, it is the primary object of this invention to facilitate the removal of elemental or loosely bound sulfur from petroleum fractions. It is another object of this invention to effect the quantitative removal of elemental or loosely bound sulfur from petroleum fractions. A further object of this invention is to provide a method for producing petroleum products completely free of elemental sulfur.

According to this invention, it has been found that the removal of elemental or loosely bound sulfur from hydrocarbon fractions can be achieved by contacting a hydrocarbon fraction containing elemental sulfur with an organic phosphite having the formula:

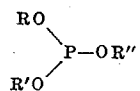

where R is selected from the group consisting of alkyl and cycloalkyl radicals having up to twenty-five carbon atoms per radical, and R' and R" are selected from the group consisting of alkyl and cycloalkyl radicals having up to twenty-five carbon atoms per radical, and aryl radicals. Examples or organic phosphites which are effective for the removal of elemental or loosely bound sulfur from hydrocarbon fractions are trimethyl phosphite, triethyl phosphite, tri-n-propyl phosphite, tri-2-propyl phosphite, tributyl phosphite, tri-isobutyl phosphite, triamyl phosphite, trihexyl phosphite, tri-2-ethylhexyl phosphite, tri-isooctyl phosphite, tricyclohexyl phosphite, and 2-ethylhexyl-octyl-phenyl phosphite. Triaryl phosphites, such as triphenyl phosphite or tri-p-tolyl phosphite, do not react with elemental or loosely-bound sulfur in hydrocarbon fractions according to the conditions of this invention to produce a product which is free of elemental or loosely bound sulfur. Dialkyl, dicycloalkyl or diaryl hydrogen phosphites of the formula,

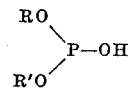

also do not react with elemental or loosely-bound sulfur in hydrocarbon fractions according to the conditions of this invention to produce a product free of elemental or loosely bound sulfur. Mixtures of trialkyl phosphites or of tricycloalkyl phosphites with inactive phosphites such as triaryl phosphites may, however, be used for the purposes of this invention, but only the active portion thereof (consisting of trialkyl phosphites and/or tricycloalkyl phosphites) is effective for the removal of elemental or loosely bound sulfur from hydrocarbon fractions. In general, the trialkyl phosphites and tricycloalkyl phosphites are very soluble in petroleum fractions. In the practice of this invention the organic phosphite may be added directly to the hydrocarbon fraction containing elemental or loosely bound sulfur, or it may first be made up into a concentrate (for example, one containing 20% by weight of the organic phosphite) with a small portion of the hydrocarbon fraction to be treated, after which the concentrate is fed in the proper proportion into the main portion of the hydrocarbon fraction.

To effect the removal of the elemental or loosely bound sulfur from hydrocarbon fractions in which residual phosphorus compounds would not be detrimental, the selected phosphite and composition containing elemental sulfur are mixed together and either allowed to stand at ambient temperatures for periods up to several days or heated to temperatures as high as 500° F. for a short period. Reaction of the elemental sulfur with the selected phosphite is rapid in most cases at ambient temperatures, although complete reaction may require several hours standing. If the mixture is heated to as high as 120–200° F., reaction is usually complete in a few minutes. Gasolines or petroleum fractions destined as gasoline blending components are preferably treated with organic phosphites by this method; the products formed in the reaction are soluble in gasoline, are non-corrosive, and also may act as pre-ignition suppressors on the combustion of the gasoline during use. In the case of naphthas containing elemental or loosely bound sulfur, it is preferable to treat the naphtha with a selected organic phosphite in such manner that the finished naphtha will be free of both elemental sulfur and phosphorus compounds. The organic phosphite should be so selected that it and its reaction product with elemental sulfur boil below or (preferably) above the boiling range of the finished naphtha. The selected organic phosphite is added to the naphtha containing elemental sulfur and the mixture is distilled so that the phosphorus-containing reaction products are separated, either by being distilled first from the naphtha, or by being left in the bottoms from the distillation of the mixture. Moreover, the presence of the selected organic phosphite in the naphtha prevents the appearance of elemental sulfur in naphtha products distilling above 300° F. A preferred method of addition of the selected organic phosphite to the naphtha, or naphtha stock, is the continuous injection of the higher boiling selected phosphite into the naphtha before it enters the fractionating tower. The naphtha distills over free of elemental sulfur, while the reaction product of the sulfur and organic phosphite, being very high-boiling and essentially stable, remains in the residue from the distillation. The amount of free sulfur usually present in various hydrocarbon compositions is small, generally not in excess of 0.01% by weight. Accordingly, only very small proportions of the organic phosphite (one molecular weight of the organic phosphite per atomic weight of sulfur) are necessary and the bottoms from the distillation usually can be utilized in any customary manner (except as fancy naphthas) without interference from the small amount of organic phosphorus reaction product. The distillate from the fractionating column is essentially free of elemental sulfur, as shown by a copper strip corrosion test at 122° F. (A. S. T. M. D130) on the naphtha. The copper strip remains untarnished showing that no free sulfur is present. The freedom from elemental sulfur is also shown by shaking the distillate with metallic mercury. No fine black precipitate of mercuric sulfide is formed. The distillate can be further treated with caustic soda solution to remove odoriferous and acidic bodies, if desired or required. The treatment of a gasoline, naphtha or other hydrocarbon fraction with a selected organic phosphite may be carried out either before or after the usual sweetening operation. Organic phosphites show essentially no effect on mercaptans, the cause of sourness in petroleum fractions. If desired, treatment by a conventional oxidative sweetening process may be carried out prior to the treatment with a selected organic phosphite.

Various qualitative and quantitative methods are available for determining the presence and/or concentration of elemental sulfur in the hydrocarbon composition to be treated. One quantitative method has been mentioned previously and several involving color comparison techniques are described by Kalichevsky in "Sweetening and Desulfurization of Light Petroleum Products," Petroleum Refiner, 29 (12), 113 et seq.

Broadly, this invention is concerned with the substantially complete removal of elemental or loosely bound sulfur from hydrocarbon compositions. The expression "elemental or loosely bound sulfur" employed in the description of the invention is that sulfur which can be detected in a hydrogen sulfide-free hydrocarbon composition by means of the sensitive copper strip test method for free and corrosive sulfur in petroleum products (A. S. T. M. D130), carried out at 122° F., and the sensitive mercury test wherein a portion of the hydrogen sulfide-free hydrocarbon composition is shaken violently with up to 5% of its volume of clean mercury. Any free sulfur causes the precipitation of fine, black mercuric sulfide. Compositions especially adaptable to treatment by the method of this invention are petroleum fractions boiling up to 750° F. at atmospheric pressure. These include light distillates, such as industrial petroleum naphthas and solvents; gasoline-type motor fuels and motor fuel blending components; kerosines, etc.; and the middle distillates, such as diesel fuels, heater and furnace oils, etc. The phosphite treating agent employed in this invention is used in substantially stoichiometric amounts. To insure a complete removal of the "elemental or loosely bound sulfur" it is preferred that slightly in excess of the stoichiometric amount be utilized.

The following examples demonstrate the effectiveness of this invention:

*Example 1.*—A straight-run naphtha fraction boiling between 310° F. and 415° F., which had been sweetened by agitation with doctor (sodium plumbite) solution and sufficient free sulfur to give a "break," was found to be corrosive in the copper strip corrosion test at 122° F. and to contain 0.002% w. free sulfur. This naphtha was admixed with 0.03 gram of tri-2-ethylhexyl phosphite per 100 grams of the sweetened naphtha fraction (slightly more than one molecular weight of the organic phosphite per atomic weight of sulfur) and the mixture was fractionally distilled to produce a naphtha distillate boiling between 310° F. and 400° F. The naphtha distillate contained no free sulfur. The odor was improved slightly by washing with 5% sodium hydroxide solution. Both the naphtha distillate as recovered, and the caustic-washed naphtha distillate, produced no tarnish on the copper strip during the copper strip corrosion test at 122° F. The phosphorus compounds remained in the residue from the distillation.

*Example 2.*—A thermally cracked gasoline boiling between 100° F. and 375° F. was sweetened by agitation with doctor solution and sufficient sulfur to give a "break." The resulting gasoline was corrosive to the copper strip corrosion test at 122° F. and contained 0.003% free sulfur. This gasoline was rendered non-corrosive to the copper strip corrosion test at 122° F. by adding 0.04 g. of tri-isooctyl phosphite to each 100 grams of the gasoline and allowing the mixture to stand for four hours. The gasoline was suitable as fuel for automobile engines without further treatment.

It is evident that the foregoing examples are only illustrative, non-limiting instances of this invention, which is limited only as indicated by the appended claims which define.

1. A process for the removal of elemental or loosely bound sulfur from a hydrocarbon composition which comprises contacting said hydrocarbon composition with an organic phosphite having the following general formula:

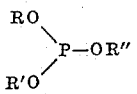

where R is selected from the group consisting of alkyl and cycloalkyl radicals containing up to 25 carbon atoms, and R' and R" are selected from the group consisting of alkyl and cycloalkyl radicals containing up to 25 carbon atoms, and aryl radicals, in an amount at least sufficient to completely react with said sulfur.

2. A process in accordance with claim 1 in which the said reaction is carried out at ambient temperatures.

3. A process in accordance with claim 1 in which the said reaction is carried out at a temperature below 500° F.

4. A process in accordance with claim 1 in which said organic phosphite is selected from the group consisting of trialkyl phosphites, tricycloalkyl phosphites, dialkyl cycloalkyl phosphites, dicycloalkyl alkyl phosphites, alkyl diaryl phosphites, dialkyl aryl phosphites, and mixtures thereof.

5. A process in accordance with claim 1 in which said organic phosphite is trimethyl phosphite.

6. A process in accordance with claim 1 in which said organic phosphite is triethyl phosphite.

7. A process in accordance with claim 1 in which said organic phosphite is tri-2-propyl phosphite.

8. A process in accordance with claim 1 is which said organic phosphite is tributyl phosphite.

9. A process in accordance with claim 1 in which said organic phosphite is trihexyl phosphite.

10. A process in accordance with claim 1 in which the hydrocarbon composition is a gasoline or gasoline fraction boiling below 425° F.

11. A process in accordance with claim 1 in which the hydrocarbon composition is a petroleum fraction boiling below 650° F. at 760 mm. of mercury pressure.

12. A process for the removal of elemental or loosely bound sulfur from a petroleum fraction which comprises fractionally distilling said fraction in the presence of not less than the stoichiometric amount of an organic phosphite, boiling at least 20° F. above or below the boiling range of the distillate being collected, having the general formula:

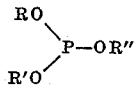

where R represents alkyl and cycloalkyl radicals containing up to 25 carbon atoms, and R' and R" represent alkyl and cycloalkyl radicals containing up to 25 carbon atoms, and aryl radicals, and recovering a distillate product substantially free from said sulfur and from phosphorus compounds.

13. A process in accordance with claim 12 in which the distillation is carried out at temperatures below 500° F.

14. A process in accordance with claim 12 in which the said organic phosphite is selected from the group consisting of trialkyl phosphites, tricycloalkyl phosphites, dialkylcycloalkyl phosphites, dicycloalkyl alkyl phosphites, alkyl diaryl phosphites, dialkyl aryl phosphites and mixtures thereof.

15. A process in accordance with claim 12 in which the said organic phosphite is trihexyl phosphite.

16. A process in accordance with claim 12 in which the said organic phosphite is tri-isooctyl phosphite.

17. A process in accordance with claim 12 in which the said organic phosphite is tri-2-ethylhexyl phosphite.

18. A process in accordance with claim 12 in which the hydrocarbon composition is a naphtha boiling below 450° F.

19. A process in accordance with claim 12 in which the distillate is treated further with sodium hydroxide solution to improve its odor and neutralization number.

20. A process in accordance with claim 12 in which the petroleum fraction to be treated is a sweetened product.

References Cited in the file of this patent

UNITED STATES PATENTS

| | | |
|---|---|---|
| 2,413,353 | Hunter et al. | Dec. 31, 1946 |
| 2,427,173 | Withrow | Sept. 9, 1947 |